United States Patent [19]
de Hoop et al.

[11] Patent Number: 5,677,893
[45] Date of Patent: Oct. 14, 1997

[54] METHOD OF PROCESSING SEISMIC DATA

[75] Inventors: Maarten de Hoop, Golden, Colo.;
Robert Burridge, Ridgefield, Conn.;
Carl Peter Spencer, Great Abington,
United Kingdom

[73] Assignee: Schlumberger Technology Corporation, Houston, Tex.

[21] Appl. No.: 499,584

[22] Filed: Jul. 7, 1995

[30] Foreign Application Priority Data

Jul. 7, 1994 [GB] United Kingdom ............... 9413659
Jun. 9, 1995 [GB] United Kingdom ............... 9511786

[51] Int. Cl.$^6$ .................................................. G01V 1/28
[52] U.S. Cl. .............................. 367/50; 367/38; 364/421
[58] Field of Search .............................. 367/25, 38, 50, 367/73; 364/421

[56] References Cited

U.S. PATENT DOCUMENTS

| | | | |
|---|---|---|---|
| 4,562,540 | 12/1985 | Devaney | 364/421 |
| 4,594,662 | 6/1986 | Devaney | 364/400 |
| 4,764,904 | 8/1988 | Salomonsen et al. | 367/70 |
| 4,803,666 | 2/1989 | Alford | 367/36 |
| 4,817,061 | 3/1989 | Alford et al. | 361/75 |
| 4,841,490 | 6/1989 | Carron | 367/38 |
| 4,852,068 | 7/1989 | Track | 367/57 |
| 4,868,794 | 9/1989 | Ziolkowski | 367/23 |
| 4,888,743 | 12/1989 | Thomsen | 367/75 |
| 4,903,244 | 2/1990 | Alford | 367/36 |
| 4,922,465 | 5/1990 | Pieprzak et al. | 367/38 |
| 4,933,913 | 6/1990 | Thomsen | 367/75 |
| 4,964,099 | 10/1990 | Carron | 367/73 |
| 5,148,407 | 9/1992 | Haldorsen et al. | 367/32 |

*Primary Examiner*—Ian J. Lobo
*Attorney, Agent, or Firm*—Gordon G. Waggett; John J. Ryberg

[57] ABSTRACT

A method is provided for processing seismic data samples obtained from seismic signals propagating in an anisotropic medium. The data samples are associated with scattering angles and azimuth at each migration dip at each image point of the medium. An inverse operator is then applied to the samples so as to provide intermediate anisotropic elastic parameter combinations for each migration dip at each point of the medium. The inverse operator comprises an inverse of a scattering function for variations in elastic parameters from a reference medium against scattering angle and migration dip. The intermediate anisotropic elastic parameter combinations are then migrated to their proper locations.

7 Claims, 6 Drawing Sheets

METHOD OF PROCESSING SEISMIC DATA

BACKGROUND OF THE INVENTION

The The present invention relates to a method of processing seismic data. Such a method may be used for processing seismic data samples obtained from seismic signals propagating in an anisotropic elastic medium, such as sedimentary rocks. Such seismic data samples may be acquired by any suitable techniques (marine or land) and acquisition geometries (surface or borehole).

In conventional scattering theory, a source emits a composite wave which propagates in an elastic medium. When the wave encounters points or regions within the medium where the elastic properties change, the wavefield is altered in a way which is predictable if the changes in elastic properties are known. Such a situation .may be referred to as the forward scattering problem.

In seismic exploration, one or more sources of seismic energy emit waves into a region of interest which are scattered, for instance by reflection or refraction. One or more receivers sample the scattered waves and these samples represent the measurements or seismic data. The fine-scale geological structure and, particularly, the elastic properties of the region being explored, are not known but the seismic data contain information about the structure and properties. From the seismic data, it is required to extract details of the structure and properties of the region of the earth being explored and this may be referred to as the inverse scattering problem.

Although techniques are known which solve the inverse scattering problem for isotropic media i.e. regions where the elastic properties do not depend on the direction of incidence of the seismic energy from the source or sources, the inverse scattering problem has not previously been solved for anisotropic media, in which the elastic properties within the medium may be dependent on the direction of incidence.

SUMMARY OF THE INVENTION

The invention relates in particular to a method for determining the anisotropic properties of an unknown earth formation by means of seismic exploration. The method comprises the steps of: generating incident seismic signals for propagation through said unknown formation and detecting a range of seismic signals generated by the propagation of said incident signals through said unknown formation. The detected signals will be affected by the anisotropic properties of the unknown formation and consequently perturbed thereby. The method further includes selecting, for said unknown formation, a group of postulated anisotropic properties which would cause known perturbations in seismic signals. It will be appreciated that model earth formations can then be generated having specific postulated anisotropic properties. Subsequently, the method effects a comparison between the detected range of seismic signals from the unknown earth formation with estimated ranges that could have been produced by seismic signals propagating through earth formations made up with differing weighting of components of the postulated anisotropic properties. The estimated range that best matches the detected range is the selected, and the related weighted components of the postulated anisotropic properties attributed to said unknown earth formation.

DETAILED DESCRIPTION OF THE PREFERRED EMBODIMENT

Figure 1:
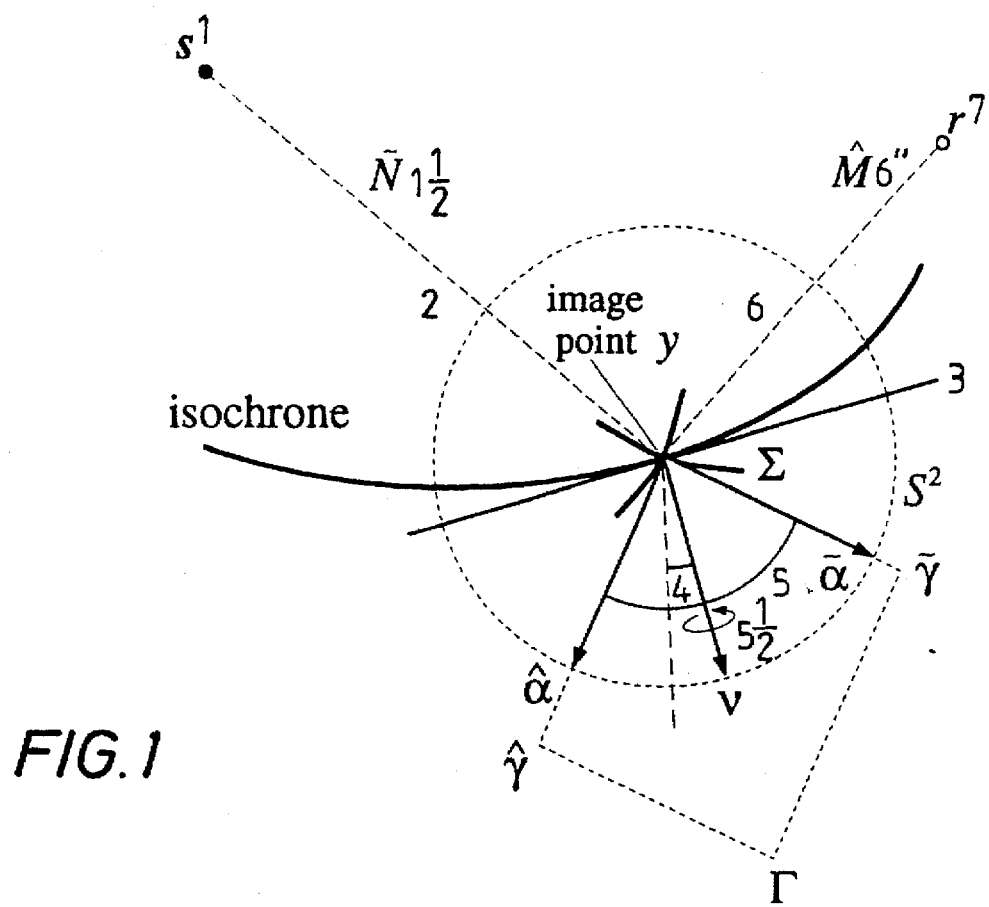
FIGS. 1 and 2 illustrate diagramatically propagation paths during seismic exploration.

FIG. 1 illustrates in simplified form a typical propagation path during seismic exploration showing the isochrone surface and the phase and group directions ($|\hat{\gamma}|$, $|\hat{\gamma}|>1$ for purpose of illustration). A seismic source 1 emits seismic waves in mode ($\hat{N}$) 1½ with a ray path 2 being illustrated, where "mode" represents polarisation. The waves pass along the ray path 2 through an anisotropic medium and are reflected at a boundary 3 where a rapid change in elastic properties occurs, for instance at the interface between layers of rock having different elastic properties. The boundary 3 is inclined with respect to the horizontal by an angle 4 known as the migration dip.

The incident waves are reflected by the boundary 3 through a scattering angle 5 and azimuth angle 5½ and travel in mode (M) 6" along a ray path 6 to a receiver 7. The two dimensional representation shown in FIG. 1 may in fact represent a three dimensional situation in which the point of reflection at the boundary 3 does not lie vertically below a line joining the source 1 and the receiver 7. In this case, the tangential plane to the point of reflection at the boundary 3 would not be perpendicular to the plane of the drawing and the migration dip 4 would be the angle of intersection between the plane and a horizontal plane.

The ray paths 2 and 6 illustrate only one possible propagation path for seismic energy from the source 1 to the receiver 7. In practice, the receiver 7 receives seismic energy from the source 1 refracted and/or reflected via many different propagation paths depending on the structure of the earth in the region being explored. Further, during seismic data acquisition, many source positions, and/or many receiver positions are used so as to record seismic data corresponding to many different propagation paths (different dips, scattering angles, and azimuth angles) in order to provide sufficient information about the region being explored for subsequent seismic data processing.

Figure 2:
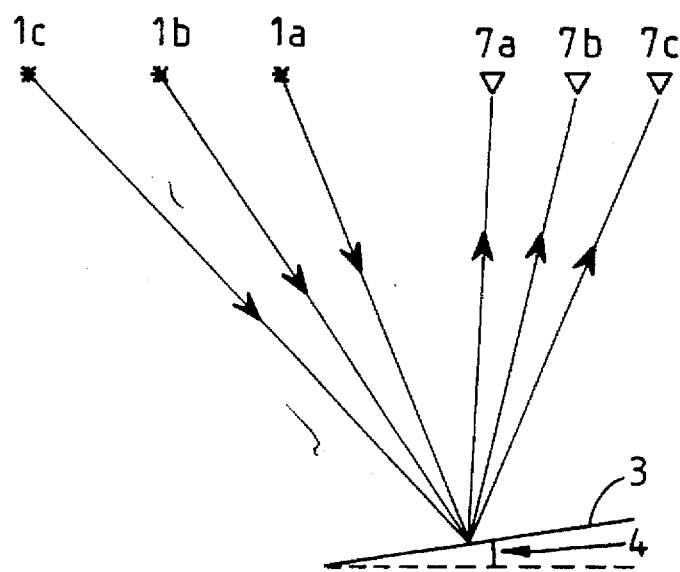

FIG. 2 illustrates three propagation paths for seismic energy reflected from a predetermined point on the boundary 3. In particular, energy from sources 1a, 1b, and 1c is reflected to receivers 7a, 7b, and 7c, respectively, with the scattering angles, azimuth angles, and amplitudes of signals received by the receivers being dependent on the anisotropic elastic parameters of the rocks at the region of the boundary 3 where reflection takes place. Thus, the seismic data sampled by each receiver contains information about the anisotropic elastic properties of every "image point" within the region being explored which scatters seismic energy on its way to the receiver. The inverse scattering problem is concerned with extracting information about the anisotropic elastic parameters at every such point of the region from the seismic data samples recorded from the receivers.

A full description and analysis of a method for performing this processing is given hereinafter. This method effectively performs processing for each image point of the region of interest so as to provide information about the changes in anisotropic elastic parameters if that image point corresponds to a scattering point. If the image point is not a scattering point, the processing reveals this by indicating that there is no change in anisotropic elastic parameters at that point. First of all, at each image point at given migration dip, all possible propagation paths from the surface to the image point and back to the surface are considered and those which start at a source and end at a receiver are selected and the scattering angle and azimuth angle for each propagation path is allocated to that path. Then, for each migration dip at that image point, the samples recorded by the receiver at the end of the propagation path are selected and a linearised inversion is performed, which may be interpreted as establishing the changes in anisotropic elastic parameter values at the image point for that migration dip based on the inverted seismic data samples. This inversion process is then performed for each of the other migration dips and the results are summed to perform migration. This process is then repeated for all of the image points in turn.

The inversion process may be explained as follows. From standard wave theory, the effect of a change or perturbation of each of the anisotropic elastic parameters at the image point on the scattering of the incident wave at the point is known and represents the scattering characteristics. If all of the actual parameters were known, they could be entered in an array of elastic parameter perturbations. A matrix could then be formed on the basis of wave theory which represented the scattering characteristics of these perturbations, particularly how the amplitude of scattered wave radiation varied with scattering angle and azimuth angle. The product of the array and the matrix would then allow the scattered radiation to be fully predicted.

The inversion process effectively performs the inverse of this operation in the present case, the effects of scattering are known; these are the data samples which are obtained from the receivers. The scattering characteristics of the elastic parameter perturbations are known from wave theory. Thus, by inverting the matrix representing the scattering characteristics and forming the product of the inverted matrix with an array comprising the data samples, information is obtained about the elastic parameter perturbations at the image point.

Each perturbation of each elastic parameter has an effect on the scattering of the incident wave. However, when several different parameters have perturbations, the effects of these perturbations on scattering are such that the individual effect of each perturbation cannot be isolated. In other words, several different combinations of different parameter perturbations could give rise to the same measured samples. The actual combination of parameter perturbation which gave rise to the measured samples cannot be definitely identified but the inversion process described in the preceding paragraph determines all possible combinations of parameter perturbations which could have produced the recorded data samples.

In order to reduce the amount of processing required, it is not necessary to make use of every recorded data sample which is available for the image point. By performing an irregular sampling of the available data samples (irregular sparse sampling), processing time may be reduced without greatly effecting accuracy.

The inversion step is performed for each migration dip and the resulting linear combinations of parameter perturbations are added together, preferably after suitable weighting. Thus, the contributions of each linear combination of parameter perturbations are summed over all migration dips so as to perform migration. The migrated combinations of anisotropic elastic parameter perturbations thus represent the output of the processing and provide the required information at the image point. Again, in order to reduce processing time, instead of using all possible migration dips, an irregular sparsely sampled set of migration dips may be used in the migration process without greatly affecting accuracy.

The actual migration process may be capable of giving a spatial resolution analysis. In particular, based on the actual geometry of the sources and receivers during data acquisition, the migration process can predict the quality of the final image by predicting how blurred the image is likely to be.

Once the migration process has been completed for the image point, the whole process is repeated for each image point in turn. Accordingly, it is possible to perform the processing for a restricted number of image points as an initial step so as to assess the effectiveness of the processing. In particular, this allows the quality of the image at the region containing the processed image points to be assessed and will give a measure of the accuracy of the background medium. In particular, if the assumptions about the values of the anisotropic elastic parameters were too inaccurate, processing in respect of the restricted number of image points will give a blurred image so that an improved estimate of the elastic parameters for the background medium can be made. If necessary, this initial "testing" procedure may be repeated so as to refine the background medium model before performing processing at all of the image points. Thus, the quality of the final seismic image of the earth can be improved or optimised without requiring processing at all of the image points until the background medium model has been made adequate or optimised.

Figure 3:
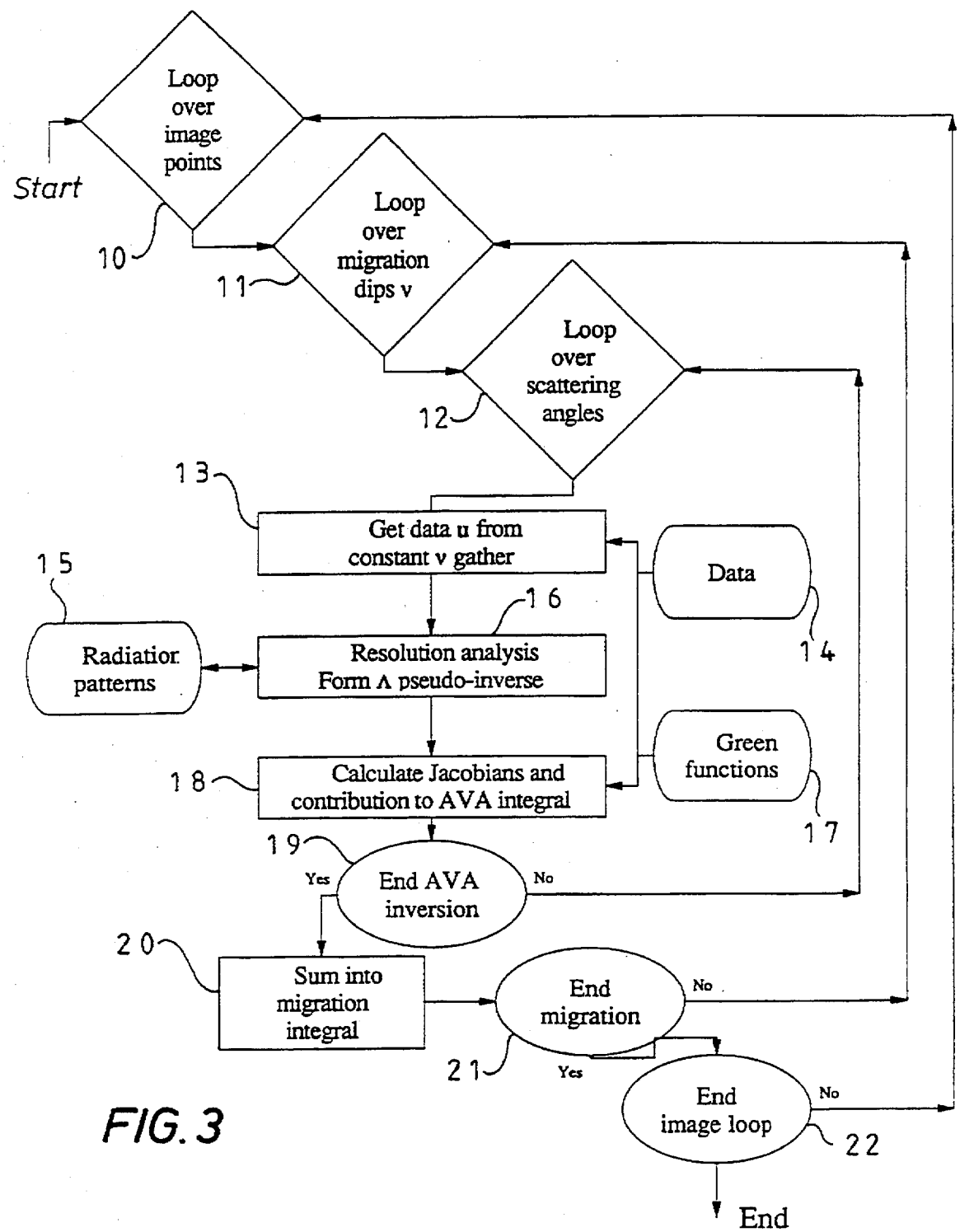
FIG. 3 is a flow diagram illustrating a processing method constituting an embodiment of the invention.

The flow diagram shown in FIG. 3 illustrates the main steps of the seismic processing method. This process evaluates the pseudo-inverse of a Fourier integral operator. A multi-parameter inversion is performed prior to migration.

The process starts by entering a loop at 10 over all of the image points in the region of interest. The method then enters another loop 11 over all of the migration dips at the current point. This loop performs a generalised Radon transformation migration which comprises integration over a 2-sphere. This provides for the proper focusing and structural positioning of the scattering points.

Figure 4:
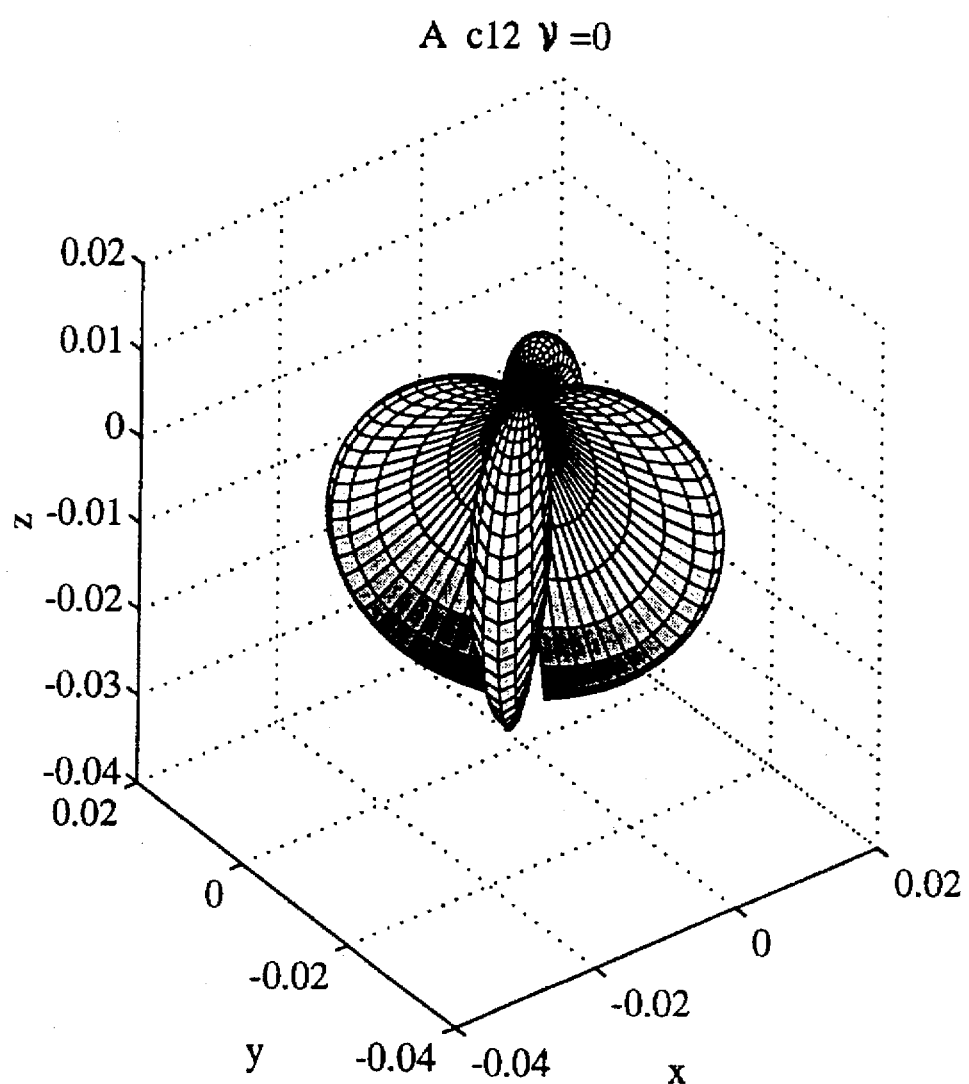
FIG. 4 shows a contrast source radiation pattern useful in the practice of the invention.

Within the loop over migration dips, the process enters a loop 12 over scattering angles at each migration dip for each image point. This is based on amplitude versus angle analysis and comprises an integration over a 2-sphere. Within this loop, the recorded seismic data samples are ordered in common migration dip gathers at 13. This effectively amounts to reordering of the data which are then stored at 14. At 15, a calculation is performed of the anisotropic contrast source radiation patterns as they follow from the local Born approximation. The patterns and the reordered data are then used at step 16, which performs a resolution analysis by forming the pseudo-inverse of A. The Jacobians are calculated taking into account the geometry of the sources and receivers during data acquisition. The relevant matrix .representation for the amplitude versus angle analysis A and its resolution analysis is performed on the basis of the singular value decomposition. The resulting anisotropic elastic parameter combinations are then ranked in accordance with their resolving power and the generalised inverse is performed. This is illustrated in FIGS. 4 to 7, for a typical shale-sandstone boundary. FIG. 4 shows one of the contrast source radiation patterns which go into A. In particular, FIG.

Figure 5A:
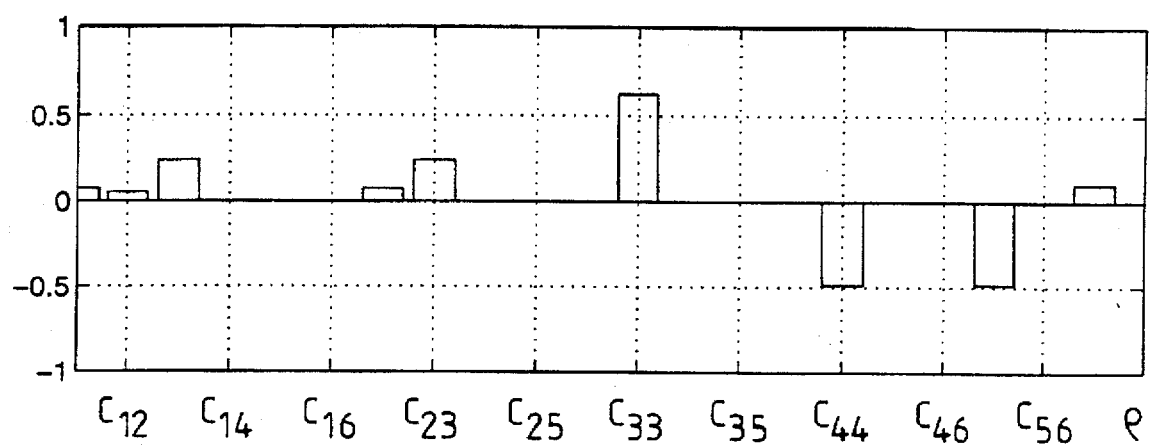
FIGS. 5a and 5b shows an optimally resolved linear combination of elastic parameter perturbations.
Figure 5B:
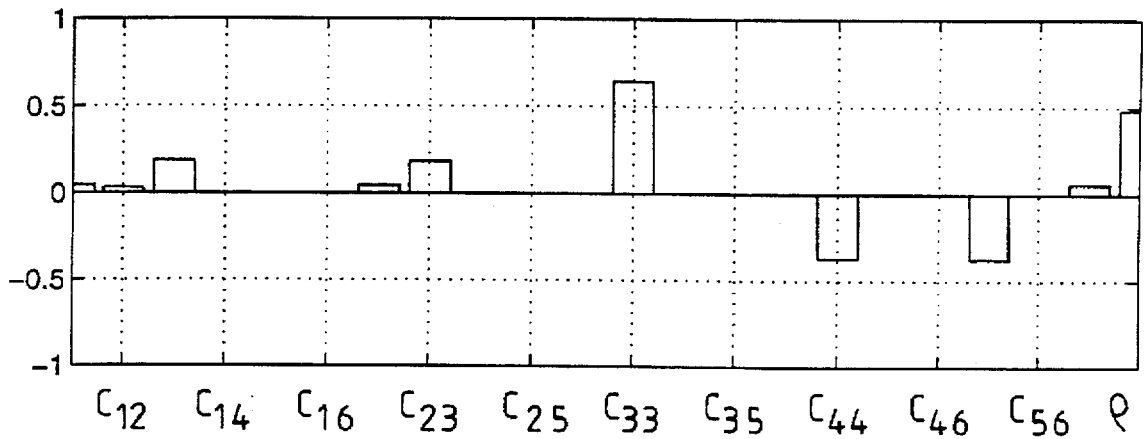
Figure 6:
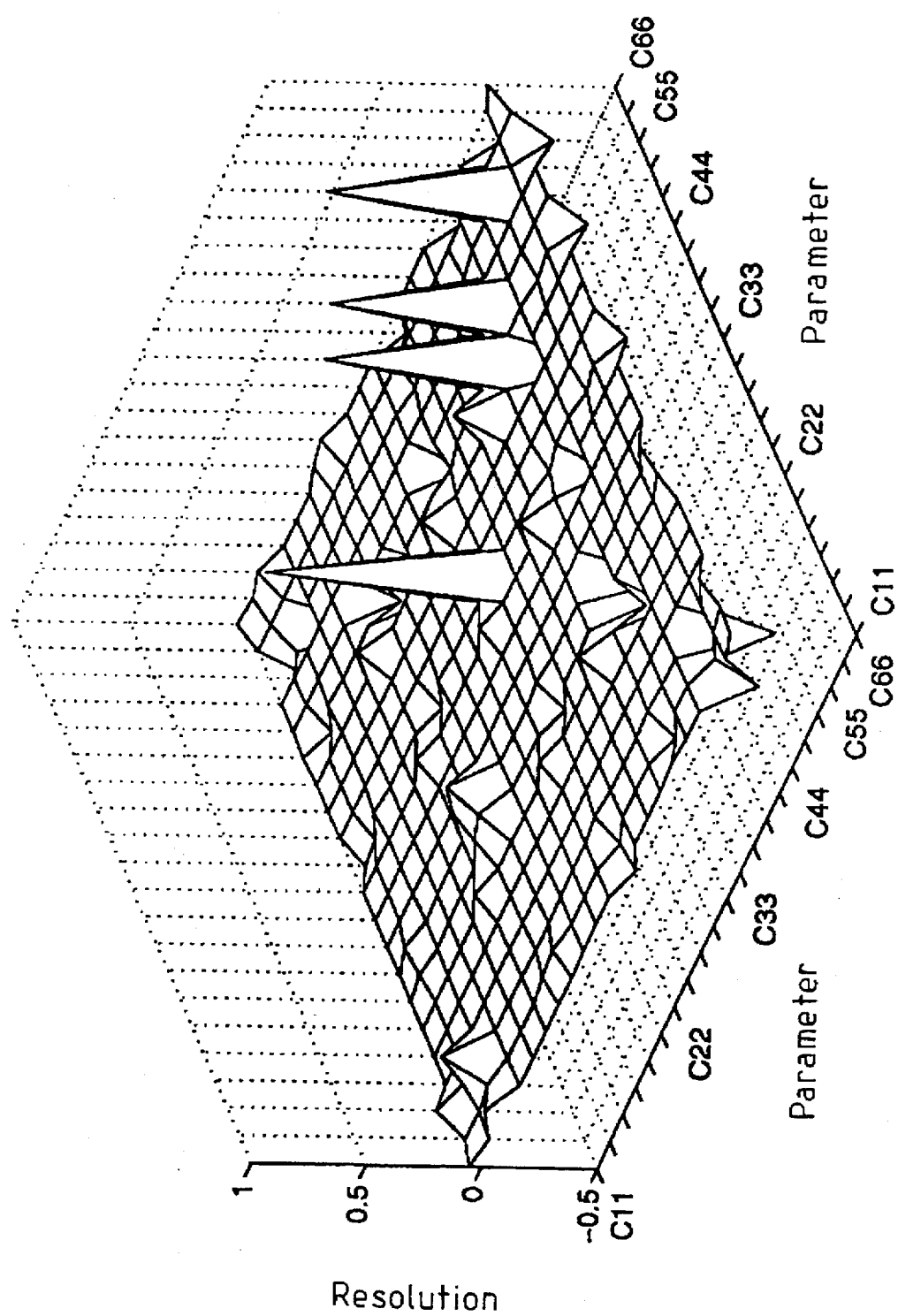
FIG. 6 shows a resolution matrix.
Figure 7B:
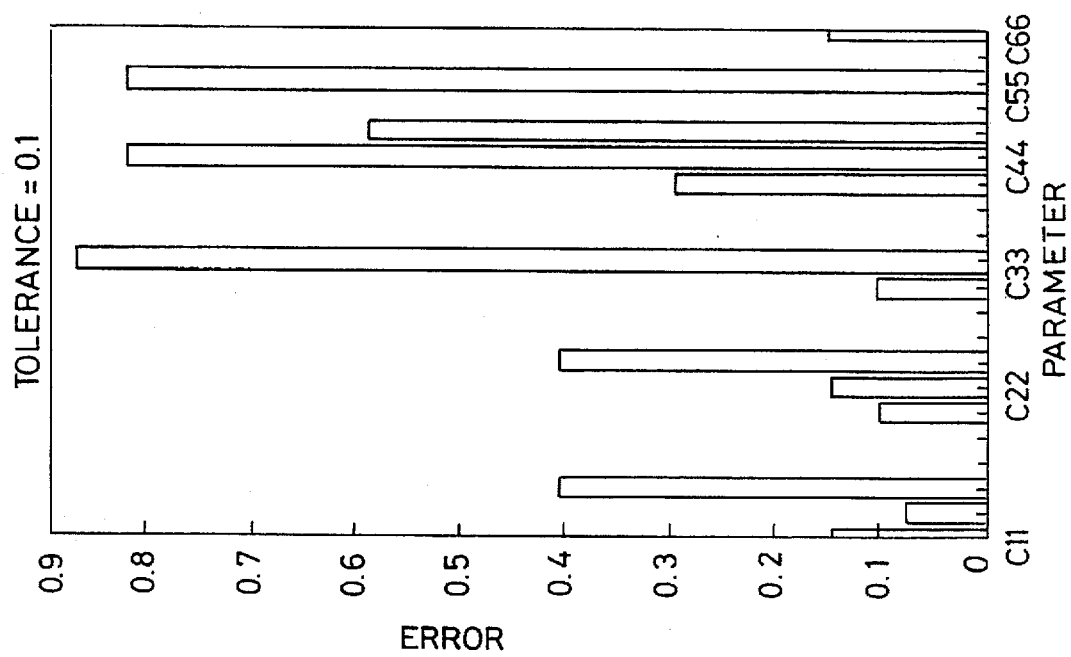
FIGS. 7a and 7b illustrate a singular value decomposition.
Figure 7A:
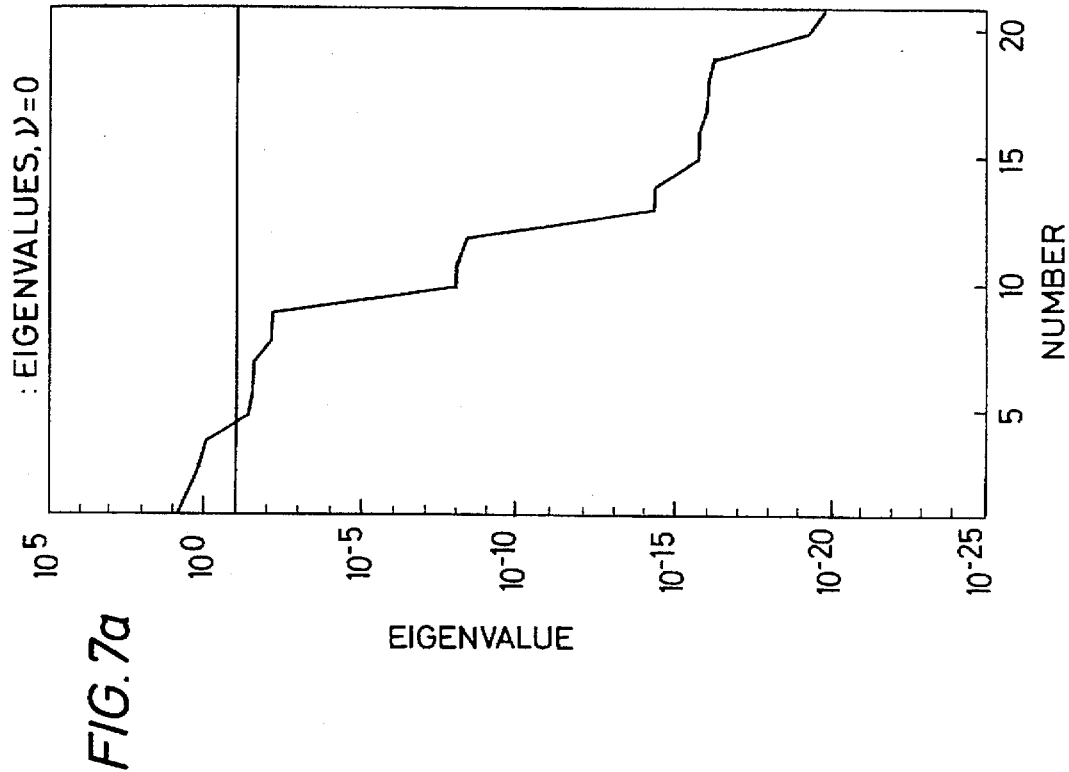

4 shows the effect of a unit perturbation of the $C_{12}$ parameter for zero dip (ν=0). This drawing indicates the strengths of reflections produced by such a perturbation in that parameter and illustrates the high directionality of reflection with respect to azimuth angle. FIGS. 5a and 5b show the optimally resolved linear combination of elastic parameters perturbations for a typical shale-sound contrast (coefficient vector nominated to 1). FIG. 6 shows the associated resolution matrix. FIGS. 7a and 7b illustrate the associated singular values of Λ, again for zero dip.

The dynamic ray tracing in the anisotropic reference medium is performed at 17 to compute the appropriate Green functions. Step 18 then calculates the Jacobians correcting for the acquisition geometry. Step 19 returns control to the step 12 if looping over the scattering angles has not yet been completed for that value of migration dip at that image point. If the loop has been completed, step 20 performs integration over the migration dip by summing the integral value into the migration integral. Steps 21 and 22 test whether Looping over migration dips has been completed and whether Looping over all image points has been completed and, if so, the process ends.

The functions used in steps 15, 16, and 17 may be precomputed and tabulated so as to reduce the required processing time. The calculations involve anisotropic ray theory, theory to find travel times and curvatures of wavefronts.

The integration over the double 2-spheres in steps 11 and 12 can be sampled sparsely as mentioned hereinbefore. In particular, Monte Carlo integration techniques may be used for the step 11 employing pseudo-random sequences such as Hammersley points.

For applications involving structural imaging, it is unnecessary to loop over the scattering angles so that the steps 12 and 19 may be omitted. The process then reduces to an anisotropic Kirchhoff imaging-migration.

In the single mode zero-offset (coincident source and receiver locations) configuration, the process may be drastically simplified. For instance, it is unnecessary to calculate the Jacobian in the step 18. Closed-form analytical expressions for the Jacobians in the method have been obtained for the time migration version.

By carrying out, in time-migration mode, pre-stack inversion-migration, performing scalarisation and applying zero-offset modelling leads, in the stationary phase approximation, to an anisotropic extension of the Dip Move Out process.

In the following, details of the derivation and application of the processing method are given.

We consider the linearised inverse problem as it follows from the contrast source Kirchhoff-type integral representations for the wave field. In this formulation we distinguish a background medium, which is supposed to be known, from a medium perturbation or contrast, which is to be constructed. To the integral representation for the scattered, reflected or transmitted, wave field, the Born approximation is applied. We then apply a high-frequency approximation for wave propagation in the background medium. As in heterogeneous or anisotropic media caustics may occur in the wavefield, special care has to be taken in the evaluation of high frequency approximation of the waves. Because of the high frequency approximation, the background medium should be geologically simple, but it may contain jumps across a sparse set of interfaces as long as they are accurately known. In this way it is possible to include high order scattering from regions in the contrast domain that would otherwise not be illuminated, in the inversion procedure.

We derive asymptotic solutions to the linearised inverse problem based on the generalised Radon transformation by G. Beylkin and R. Burridge, "Linearised Inverse Scattering Problems in Acoustics and Elasticity", Wave Motion, 12, 15–52 (1990). Such solutions have been analyzed by S. G. Norton and M. Linzer, "Ultrasonic scattering potential imaging in three dimensions: exact inverse scattering solutions for plane, cylindrical, and spherical apertures", IEEE Trans. on Biomedical Engineering, BME-28, 202–220 (1981), and later made rigorous by G. Beylkin, Generalised Radon Transform and its applications, Ph.D. Thesis, New York University (1982), and G. Beylkin, "The inversion problem and applications of the generalised Radon Transform", Comm. Pure Appl. Math., 37, 579–599 (1984). The linearised inverse problem for the (scalar) Helmholtz equation was analyzed by G. Beylkin, "Imaging of discontinuities in the inverse scattering problem by inversion of a casual generalised Radon transform", Jour. of Math. Phys., 26, 99–108 (1985), Rakesh, "A linearised inverse problem for the wave equation", Comm. in Part. Diff. Eqs., 13, 573–601 (1988), D. E. Miller, M. Oristaglio and G. Beylkin, "A new formalism and an old heuristic for seismic migration", 54th Ann. Int. Mtg. Soc. Explor. Geophys., Expanded Abstracts, 704–707 (1984), D. E. Miller, M. Oristaglio and G. Beylkin, "A new slant on seismic imaging: migration and integral geometry", Geophysics, 52, 943–964 (1987), and G. Beylkin, M. Oristaglio and D. Miller, "Spatial resolution of migration algorithms", in A. J. Berkhout, J. Ridder, and L. F. van der Waal, Acoustical Imaging, 14, Plenum Pub. Co., 155–167 (1985). A microlocal formalism was established by N. Bleistein, "On imaging of reflectors in the earth", Geoph. 52 (1987) 931–942. A rigorous treatment of the linearised inverse problem yields the correct handling of the amplitude information. The multiparameter (tensorial) inversion described in this paper follows and makes additional use of amplitude information as a function of scattering angle and azimuth to reconstruct as many parameter combinations, describing the medium perturbation, as possible.

The way we treat the multi-parameter problem, viz., using the G. Backus and F. Gilbert, "The resolving power of gross earth data", Geophys. J. R. Astr. Soc., 16, 169–205 (1968) approach, has been used extensively in isotropic AVO analysis. This becomes apparent if the local dip of the discontinuity is reconstructed prior to the inversion in the framework of a stationary phase analysis. Then we can cast our formalism in a form that resembles AVA inversion. Our formulation integrates aspects of Kirchhoff migration with those of AVA analysis, and leads to a multiple set of physically interpretable images.

The extension from isotropy to anisotropy has forced us to consider generalised (weak) inversion rather than a strong inversion on the level of multi-parameter analysis. As such, the method we propose is related to the optimisation approach suggested by A. Tarantola and B. Valette, "Generalised nonlinear inverse problems solved using the least-squares criterion", Rev. of Geoph. and Space Physics, 20, 219–232 (1982), and A. Tarantola, "A strategy for nonlinear elastic inversion of seismic reflection data", Geophysics, 51, 1893–1903 (1986). Such an approach follows from a probabilistic formulation of the inverse problem, and it handles inaccurate and incomplete data in a systematic way.

In this section we introduce the Green's tensor and the single scattering equation in a general anisotropic medium in a high frequency approximation. We embed the elastodynamic problem in a family of problems parametrised by one real parameter ϵ. Thus let $$\rho = \rho^{(0)} + \epsilon \rho^1, \tag{2.1}$$

$$c^{ijkl} = c_{ijkl}^{(0)} + \epsilon c_{ijkl}^{(1)} \qquad (2.2)$$

as $\epsilon \to 0$. We shall suppose that the actual medium is given by Eqs. (2.1) and (2.2) with a particular value of s small enough that we may neglect terms of $O(\epsilon^2)$. Expand the displacement accordingly as $$\mu = \mu^{(0)} + \epsilon \mu^{(1)} + O(\epsilon^2). \qquad (2.3)$$

Asymptotic Ray Theory

The Green's tensor, in the zero-order medium, is approximated by $$G_{ip}(x,x',t) = \sum_N A^{(N)}(x,x') \xi_i^{(N)}(x) \xi_p^{(N)}(x') \delta(t - \tau^{(N)}(x,x')) + \qquad (2.4)$$

terms smoother in $t$.

Here, the arrival time $\tau^{(N)}$ and the associated polarisation vector $\xi^{(N)}$ satisfy $$(\rho^{(0)} \delta_{ik} - c_{ijkl}^{(0)} \tau_{,j}^{(N)} \tau_{,l}^{(N)}) \xi_k^{(N)} = 0 \text{ (at all } x), \qquad (2.5)$$

which implies the eikonal equation $$det(\rho^{(0)} \delta_{ik} - c_{ijkl}^{(0)} \tau_{,j} \tau_{,l}) = 0 \text{ (at all } x). \qquad (2.6)$$

The polarisation vectors are assumed to be normalised so that $\xi_i^{(N)} \xi_i^{(N)} = 1$. Define slowness vector $\gamma^{(N)}$ by $$\gamma^{(N)}(X) = \nabla_x \tau^{(N)}(X,X'). \qquad (2.7)$$

Then Eq. (2.6) constrains $\gamma$ to lie on the sextic surface $A(x)$ given by $$det(\rho^{(0)} \xi_{ik} - c_{ijkl}^{(0)} \gamma_j \gamma_l) = 0 \qquad (2.8)$$

$A(x)$ consists of three sheets $A^{(N)}(x)$, $N=1, 2, 3$, each of which is a closed surface surrounding the origin. The amplitudes $A$ must satisfy the transport equation $$(c_{ijkl}^{(0)} \xi_i^{(N)} \xi_k^{(N)} (A^{(N)})^2 \tau_{,l}^{(N)})_{,j} = 0, \qquad (2.9)$$

where $N$, again, indicates the mode of propagation, that is the sheet of the slowness surface on which the corresponding slowness vector lies.

The characteristic or group velocities $v^{(N)}$ are normal to $A^{(N)}(x)$ at $\gamma^{(N)}$ and satisfy $$v^{(N)} \cdot \gamma^{(N)} = 1. \qquad (2.10)$$

The normal or phase velocities are given by $$V^{(N)} = \frac{1}{|\gamma^{(N)}|}, \qquad (2.11)$$

The wave front through $x$ at arrival time $\tau$ is denoted by $\Sigma^{(N)}(\tau)$. From Eq. (2.10) it follows that $$V^{(N)} = v^{(N)} \cos \chi, \qquad (2.12)$$

where $\chi$ is the angle between $v^{(N)}$ and $\gamma^{(N)}$.

The amplitudes can be expressed in terms of the Jacobians, $$A = \frac{1}{4\pi[\rho(x)\rho(x')M]^{1/2}} \text{ with } M = \frac{\left|v(x')|V(x)\left|\frac{\partial x}{\partial q_1} \wedge \frac{\partial x}{\partial q_2}\right|_x\right.}{\left|\frac{\partial \gamma}{\partial q_1} \wedge \frac{\partial \gamma}{\partial q_2}\right|_{x'}}, \qquad (2.13)$$

in which A and M carry the superscript (N), and parameters $\{q1, q2\}$ may coordinate the unit sphere of slowness directions at $x'$.

The Single Scattering Equation

We will substitute the results into the Kirchhoff-Helmholtz representation for the scattered displacement field $u^1$ in the Born approximation. First, we set $$\tilde{A}^{(N)}(x) = A^{(N)}(x,s), \hat{A}^{(M)}(x) = A^{(M)}(r,x). \qquad (2.14)$$

Then, in the case of scattering from incident $\tilde{N}$ and component q to outgoing mode $\hat{M}$ and component p, the most singular term is $$\mu_{pq}^{(1)}(r,s,t) = -\int_D \tilde{A}^{(N)}(x) \hat{A}^{(M)}(x) \tilde{\xi}_q^{(N)}(x) \hat{\xi}_p^{(M)}(r) \tilde{\xi}_i^{(N)}(x)$$

$$\delta''(t - \tilde{\tau}^{(N)}(x,s) - \hat{\tau}^{(M)}(r,x))[\rho^{(1)}(x)_{kl} + c_{ijkl}^{(1)}(x) \tilde{\gamma}_l^{(N)}(x) \hat{\gamma}_j^{(M)}(x)]dx \qquad (2.15)$$

Consider receiver-source pairs and time $(r,s,t) \in R \times S \times \mathbb{R}_{\geq 0}$. For given $(r,s,t)$ the integral over $x$ in Eq. (2.15) is restricted to the support of the $\delta$-distribution, which is the isochrone surface $$\tilde{\tau}^{(N)}(x,s) + \hat{\tau}^{(M)}(r,s) = t.$$

In Eq. (2.15) we introduced the slowness vectors at $x$ (cf. Eq. (2.7))

$$\tilde{\gamma}^{(N)}(x) = \nabla_x \tilde{\tau}^{(N)}(x,s), \hat{\gamma}^{(M)}(x) = \nabla_x \hat{\tau}^{(M)}(r,x), \qquad (2.16)$$

the associated (phase) directions $$\tilde{\alpha}^{(N)} = \frac{\tilde{\gamma}^{(N)}}{|\tilde{\gamma}^{(N)}|}, \hat{\alpha}^{(M)} = \frac{\hat{\gamma}^{(M)}}{|\hat{\gamma}^{(M)}|} \qquad (2.17)$$

and the normal (phase) velocities (cf. Eq. (2.11))

$$\tilde{V}^{(N)} = \frac{1}{|\tilde{\gamma}^{(N)}|}, \hat{V}^{(M)} = \frac{1}{|\hat{\gamma}^{(M)}|}. \qquad (2.18)$$

Then $$\theta^{(\tilde{N}\hat{M})} = \tilde{\gamma}^{(N)} + \hat{\gamma}^{(M)} \qquad (2.19)$$

determines the local dip direction $v^{(\tilde{N}\hat{M})}$ at the image point $x$ $$v^{(\tilde{N}\hat{M})} = \frac{\Gamma^{(\tilde{N}\hat{M})}}{|\Gamma^{(\tilde{N}\hat{M})}|}. \qquad (2.20)$$

This dip is a function of s, r and x. It is not the local geological dip but large contributions to the integral in Eq. (2.15) arise when it does coincide with the geological dip.

For later use, we introduce the local ray (group) directions (cf. Eq. (2.10))

$$\tilde{n}^{(N)} = \frac{\tilde{v}^{(N)}}{|\tilde{v}^{(N)}|}, \hat{n}^{(M)} = \frac{\hat{v}^{(M)}}{|\hat{v}^{(M)}|}. \qquad (2.21)$$

We also define the two-way travel time $T^{(\tilde{N}\hat{M})}$ $$T^{(\tilde{N}\hat{M})}(r,y,s) \equiv \tilde{\tau}^{(N)}(y,s) + \hat{\tau}^{(M)}(r,y). \qquad (2.22)$$

Then, from Eqs. (2.16) and (2.26) we see that $$\nabla_x T^{(\tilde{N}M)}(r,x,s) = \Gamma^{(\tilde{N}M)}(r,x,s). \tag{2.23}$$

For fixed s, r and t, the surfaces $T^{(\tilde{N}M)}(r,y,s)=t$ in y, are known as isochrone surfaces. In practice, computation of $T^{(\tilde{N}M)}$ will use the tabulated values of $\tau^{(\tilde{N})}(y,s)$.

Having introduced all the necessary geometrical quantities, we will now focus on the isochrone surfaces and their approximations. On using Eq. (2.23) we see that a first-order Taylor series expansion about a point y on an isochrone surface yields $$T^{(\tilde{N}M)}(r,x,s) \cong T^{(\tilde{N}M)}(r,y,s)+(x-y)\cdot\Gamma^{(\tilde{N}M)}(r,y,s), \tag{2.24}$$

which defines the tangent plane at y: $(x-y)\cdot\Gamma^{(\tilde{N}M)}(r,y,s)=0$. Choosing a point y, setting $t=T^{(\tilde{N}M)}(r,y,s)$ in Eq. (2.15), and using the approximation Eq. (2.24) we obtain $$u_{pq}^{(1)}(r,s,T^{(\tilde{N}M)}(r,y,s)) \cong -\xi_p^{(\tilde{M})}(r)\xi_q^{(\tilde{N})}(s)\frac{A^{(\tilde{N}M)}(y)}{|\Gamma^{(\tilde{N}M)}(r,y,s)|^3} \times \tag{2.25}$$

$$\int_D (w^{(\tilde{N}M)}(y,\hat{\alpha}^{(\tilde{N})}(y),\hat{\alpha}^{(\tilde{M})}(y)))^T c^{(1)}(x)\delta''(y-x)\cdot v^{(\tilde{N}M)}(r,y,s))dx,$$

where we have introduced the dyadic products $$\alpha_{kl}^{(\tilde{N})}=\tfrac{1}{2}V_o^{(\tilde{N})}(\xi_k^{(\tilde{N})}\gamma_l^{(\tilde{N})}+\xi_l^{(\tilde{N})}\gamma_k^{(\tilde{N})}), \tag{2.26}$$

$$\hat{\alpha}_{kl}^{(\tilde{N})}=\tfrac{1}{2}V_o^{(\tilde{N})}(\xi_i^{(\tilde{N})}\hat{\gamma}_j^{(\tilde{N})}+\xi_j^{(\tilde{N})}\hat{\gamma}_i^{(\tilde{N})}), \tag{2.27}$$

the product of scalar amplitudes $$A^{(\tilde{N}M)}(x)=\rho^{(0)}(x)\tilde{A}^{(\tilde{N})}(x)\hat{A}^{(\tilde{M})}(x) \tag{2.28}$$

and $$c^{(1)} = \left\{ \frac{\rho^{(1)}}{\rho^{(0)}}, \frac{c_{ijkl}^{(1)}}{\rho^{(0)}V_o^{(\tilde{M})}V_o^{(\tilde{N})}} \right\}, \tag{2.29}$$

while, using the symmetries of $c_{ijkl}^{(1)}$, $$w^{(\tilde{N}M)}=\{\xi_i^{(\tilde{N})}\xi_i^{(\tilde{M})}, \tfrac{1}{2}[\hat{a}_{ij}^{(\tilde{N})}\tilde{a}_{kl}^{(\tilde{M})}+\hat{a}_{kl}^{(\tilde{N})}\tilde{a}_{ij}^{(\tilde{M})}]\}. \tag{2.30}$$

Here, $V_o^{(L)}$ denote the (local) normal velocity, i.e., reciprocal magnitude of the slowness, of mode L in the background medium for γ in the 3-direction. The notation $_o$ is meant to emphasize that the quantity is angle independent. In Eq. (2.25) we recognise the obliquity factor $1/|\Gamma^{(\tilde{N}M)}|^3$, which arises because δ" is homogeneous of degree −3.

MULTI-PARAMETER INVERSION

In the inverse scattering formulation, we will assume that in the measurements $u^{(0)}$ is negligible compared with $u^{(1)}$. This assumption goes together with the assumption that the zero-order medium is smooth compared with the wave length, and in particular twice continuously differentiable to avoid shadow zones. These constrains simplify the inversion procedure, but can be removed if required.

Single Mode Conversion

As a first step in the inversion procedure we get rid of the dependence of Eq. (2.25) upon p,q by solving for the integral over D, which we refer to as $U^{(\tilde{N}M)}(r,y,s)$. Thus $$U^{(\tilde{N}M)}(r,y,s)=\int_D (w^{(\tilde{N}M)}(y,$$
$$\tilde{\alpha}^{(\tilde{N})}(y),\hat{\alpha}^{(\tilde{M})}(y)))^T c^{(1)}(x)\delta''((y-x)\cdot v^{(\tilde{N}M)}(r,y,s))dx \tag{3.1}$$

Equation (2.25) is indexed by p, q and y, and the quantity $U^{(\tilde{N}M)}(r,y,s)$ may be obtained from it by a generalized inversion, or by dividing by the factor on the first line of the right member of the equation for some particular values of p, q, or for instance by forming $$U^{(\tilde{N}M)}(r,y,s) = \xi_p^{(\tilde{M})}(r)u_{pq}^{(1)}(r,s,T^{(\tilde{N}M)}(r,y,s))\xi_q^{(\tilde{N})}(s)\frac{|\Gamma^{(\tilde{N}M)}(r,y,s)|^3}{A^{(\tilde{N}M)}(y)}. \tag{3.2}$$

Whatever method of calculation is used, $U^{(\tilde{N}M)}(r,y,s)$ is calculated from the data, and our problem is to solve the integral equation (3.1) for $c^{(1)}(x)$, regarding $U^{(\tilde{N}M)}(r,y,s)$ as given. We refer to Eq. (3.1) as the local scalar single scattering equation.

We will eventually employ Gel'fand's plane wave expansion to express the perturbation $c^{(1)}$ in terms of $U^{(\tilde{N}M)}$. For this we have to integrate over $v^{(\tilde{N}M)}$. In order to simplify the notation, the superscripts $\bar{N}$, $M$ are omitted whenever it is obvious what they are. The unit vector v is a function of α and $\hat\alpha$, which in turn are functions of s and r for y given. Let θ be defined by $$\cos\theta = \alpha^{(\tilde{N})}\cdot\alpha^{(\tilde{M})}, \tag{3.3}$$

and let Ψ be the azimuth measured around v, like the third Euler angle. Then α and $\hat\alpha$ are functions of v, θ and Ψ. We will integrate Eq. (3.1) over α and $\hat\alpha$. To this end, we multiply Eq. (3.1) by the form $d\alpha d\hat\alpha$ and subsequently consider the following changes of variables at the scattering point on the the left and on the right:

$$d\tilde{\alpha}^{(\tilde{N})}d\hat{\alpha}^{(\tilde{M})} = \begin{cases} \frac{\partial(\tilde{\alpha},\hat{\alpha})}{\partial(s,r)} drds & \text{on the LHS: } \{\tilde{\alpha}^{(\tilde{N})},\hat{\alpha}^{(\tilde{M})}\}\to\{s,r\}, \\ \frac{\partial(\tilde{\alpha},\hat{\alpha})}{\partial(v,\theta\psi)} dvd\theta d\psi & \text{on the RHS: } \{\tilde{\alpha}^{(\tilde{N})},\hat{\alpha}^{(\tilde{M})}\}\to\{v,\theta,\psi\} \end{cases} \tag{3.4}$$

The unit vector v appears explicitly in the RHS so that we may later use Gel'fand's plane wave expansion, which is equivalent to the inversion for the Radon transform. The angles in the right-hand side vary through the ranges θ∈[0, π), v∈$S^2$ and Ψ∈[0,2π); for given v, (θ,Ψ) are functions of $\alpha^{(\tilde{N})}$, $\hat\alpha^{(\tilde{M})}$. In practice, their ranges will be restricted by the acquisition geometry. The Jacobians are taken at the scattering or image point y.

To carry out the multi-parameter inversion, we introduce the covariance function $\sigma_U^2(\alpha^{(\tilde{N})}(y), \hat\alpha^{(\tilde{M})}(y))$ associated with the a posteriori noise probability distribution from the measurements) and the covariance matrix $\sigma_c^2$ (associated with some of priori probability distribution from the subsurface) with the same subscripts as $c^1$. In the inversion process the normal matrix is given by $$\lambda^{(\tilde{N}M)}=\sigma_U^{-1}w^{(\tilde{N}M)T}, \tag{3.5}$$

where the covariance $\sigma_U^2$ is essentially a function of θ and Ψ being parametrised by v, but may also depend on $\bar{N}M$ as well as on p, q. We integrate the normal matrix over the scattering and azimuthal angles θ and Ψ at y holding v constant (see Eqs. (3.4) and (3.5))

$$\Lambda^{(\tilde{N}M)}(v) = \int \lambda^{(\tilde{N}M)} \frac{\partial(\tilde{\alpha},\hat{\alpha})}{\partial(v,\theta\psi)} d\theta d\psi + \sigma_c^{-1}. \tag{3.6}$$

Λ is square and is dependent on the zero-order medium; and on the source-receiver geometry only through v. (Thus, for each y it would be natural to order the data in common v-panels.) The matrix can be inverted in a generalized sense using singular value decomposition. Thus the inverse may vary with dip v and image point location y; this variation will potentially be eliminated by an appropriate reparametrisation of the form discussed in the previous section.

Otherwise, a covariance matrix different from the identity perturbs the eigenvalues of the matrix $w^{(\tilde{N}\hat{M})}(w^{(\tilde{N}\hat{M})})^T$, and thus takes care of stabilizing the inversion. Note that there may exist particular linear dependencies among the components of $$\tfrac{1}{2}[\hat{a}_{ij}^{(N)}\tilde{a}_{kl}^{(N)} + \hat{a}_{kl}^{(N)}\tilde{a}_{ij}^{(N)}]$$

that hold for all ($\theta$, $\Psi$), given v. In particular, they may arise from coinciding (up to signs) pairs of components $$(\hat{\gamma}_{jo}^{(M)}, \xi_{ko}^{(N)}), (\hat{\gamma}_{jo}^{(M)}, \gamma_{ko}^{(N)}), (\xi_{jo}^{(M)}, \xi_{ko}^{(N)}), \text{ or } (\xi_{jo}^{(M)}, \gamma_{ko}^{(N)})$$

of the slowness and polarisation vectors for v fixed, caused by the symmetries of the zero-order or background medium. As a consequence, the associated eigenvalues of the matrix $\Lambda$ will vanish.

For $y \in D$ Gel'fand's plane wave expansion, $$\int_{S^2} \delta''((y-x)\cdot v) dv = -8\pi^2 \delta(x-y),$$

is used to get $$\int_{S^2} \int_D c^{(1)}(x) \delta''((y-x)\cdot v) dx dv = -8\pi^2 c^{(1)}(y). \quad (3.7)$$

Here, $c^{(1)}$ denotes the resolvable subset of $c^{(1)}$, which is supposed not to vary with v. Thus, multiply Eq. (3.1) by $\sigma_U^{-1} w^{(\tilde{N}\hat{M})}$ and integrate over $\{\alpha^{(N)}, \hat{\alpha}^{(M)}\}$. Then, using Eqs. (3.4) to (3.7), we get $$8\pi^2 c^{(1)}(y) = \int_{\partial S \times \partial R} (\Lambda^{(\tilde{N}\hat{M})}(y,v(r,y,s)))^{-1} \sigma_U^{-1} w^{(\tilde{N}\hat{M})} \quad (3.8)$$

$$U^{(\tilde{N}\hat{M})}(r,y,s) \frac{\partial(\tilde{\alpha},\hat{\alpha})}{\partial(s,r)} \Big|_y drds.$$

To carry out the inversion we still have to evaluate the relevant Jacobians introduced in Eq. (3.4). The RHS Jacobian of Eq. (3.4), occurring in the integrated normal matrix is given by $$\frac{\partial(\tilde{\alpha},\hat{\alpha})}{\partial(v,\theta,\psi)} = \frac{\sin\theta}{1 + (|\tilde{\gamma}||\hat{\gamma}|/|\Gamma|^2)(\tan\tilde{\chi} - \tan\hat{\chi})\sin\theta}, \quad (3.9)$$

where $$\cos\tilde{\chi} = \tilde{n}\cdot\tilde{\alpha} \text{ and } \cos\hat{\chi} = \hat{n}\cdot\hat{\alpha} \quad (3.10)$$

The LHS Jacobian is directly related to dynamic ray theory. We have the factorisation $$\frac{\partial(\tilde{\alpha},\hat{\alpha})}{\partial(s,r)}\Big|_y = \frac{\partial(\tilde{\alpha})}{\partial(s)}\Big|_y \frac{\partial(\hat{\alpha})}{\partial(r)}\Big|_y \quad (3.11)$$

In general, the factors can be expressed in terms of the dynamic ray amplitudes since, like the amplitudes, they follow from a variation of the anisotropic ray tracing equations (see Eq. (2.13)). For the source side:

$$\frac{\partial(s)}{\partial(\tilde{\alpha})}\Big|_y = \frac{1}{16\pi^2 \rho(s)\rho(y)\tilde{V}^{(N)}(s)(\tilde{V}^{(N)}(y))^3(\tilde{A}^{(N)}(y))^2} \quad (3.12)$$

as long as $\delta S$ in the neighbourhood of s coincides with the wave front $\Sigma(y,\tau^{(N)}(s,y))$. If this is not the case, we have to correct for the ratio of the area on $\delta S$ to the area on the wave front $\Sigma(y,\tau^{(N)}(s,y))$ at s onto which it is mapped by projection along the rays. This arises from the fact that $\delta S$ is not necessarily tangent to $\Sigma(y,\tau^{(N)}(s,y))$ at s. It amounts to dividing the previous Jacobian by the Jacobian $$\frac{\partial(s^\Sigma)}{\partial(s)} = (\tilde{\alpha}(s)\cdot\tilde{\beta}(s)),$$

where $s^\Sigma$ denotes the coordinates on $\Sigma(Y,\tau^{\tilde{N}})(s,y))$ intersecting $\delta S$ at s, and $\tilde{n}(s)$=group or ray direction at source
$\tilde{\beta}(s)$=normal to $\delta S$~$\delta D$ at source.

Note that $\tilde{\alpha}(s)$ is the normal to the wave front at s. Similar expressions hold for the receiver side.

Combined Mode Conversions

To combine different modes in the inversion, we go back to Eq. (3.1). Rather than using the coordinates $(\alpha^{(N)}, \hat{\alpha}^{(M)})$ at y, we consider the angles $(v,\theta,\Psi)$ in conjunction with $(\tilde{N}, \hat{M})$ as preferred coordinates. Then $s = s(\tilde{N},\hat{M},v,\theta,\Psi), r = r(\tilde{N},\hat{M},v,\theta,\Psi)$.

By ordering the integrations over (s,r) as $$\int v_0 \in S^2 \{\delta Sx\delta R|v(r,y,s)=v_0\}$$

we identify the inner integral (for fixed y) as a 3-dimensional AVA inversion and the outer integral over $v_o$ as the migration. Define $$\Lambda(v) = \sum_{\tilde{N},\hat{M}} \int \lambda^{(\tilde{N}\hat{M})} \frac{\partial(\tilde{\alpha},\hat{\alpha})}{\partial(v,\theta,\psi)} d\theta d\psi + \sigma_c^{-1}. \quad (3.13)$$

The resolving power of $\Lambda(v)$ benefits from the summation over modes. Summing $U^{(\tilde{N}\hat{M})}$) over the modes and integrating the result over s,r, we obtain $$8\pi^2 c^{(1)}(y) = \int_{\partial S \times \partial R} (\Lambda(y,v(r,y,s)))^{-1} \quad (3.14)$$

$$\left[ \sum_{\tilde{N},\hat{M}} \sigma_U^{-1} w^{(\tilde{N}\hat{M})} U^{(\tilde{N}\hat{M})}(r,y,s) \frac{\partial(\tilde{\alpha},\hat{\alpha})}{\partial(s,r)} \Big|_y \right] drds$$

instead of Eq. (3.8). In this process, in view of the integration over r and s for given $T^{(\tilde{N}\hat{M})}$, we still have to identify the individual N to M conversions in $U^{(\tilde{N}\hat{M})}$.

We claim:

1. A method of processing seismic data samples obtained from seismic signals, propagating in an anisotropic medium, comprising the steps of:

(a) corresponding the seismic data samples with scattering angles and azimuth at each migration dip at each point of the medium;

(b) applying, an inverse operator to the seismic data samples corresponded according to step (a), so as to produce intermediate anisotropic elastic parameter combinations for each migration dip at each point of the medium, the inverse operator comprising an inverse of a scattering function for variations in elastic parameters from a reference medium against scattering angle, azimuth and migration dip; and (c) migrating the intermediate anisotropic elastic parameter combinations to their proper locations.

2. The method of claim 1 in which the step (c) is performed in accordance with a Generalised Radon Transform.

3. The method of claim 2 in which the Generalized Radon Transform has Jacobians defined by:

$$\frac{\partial(s)}{\partial(\alpha)}\bigg|_y = \frac{1}{16\pi^2\rho(s)\rho(y)\tilde{V}^{(N)}(s)(\tilde{V}^{(N)}(y))^3(\tilde{A}^{(N)}(y))^2}$$

and $$\frac{\partial(\tilde{\alpha},\hat{\alpha})}{\partial(\upsilon,\theta,\psi)} = \frac{\sin\theta}{1 + (\tilde{r}|\hat{r}\psi/|\Gamma|^2)(\tan\hat{\chi} - \tan\tilde{\chi})\sin\theta}.$$

4. The method of claim 1, further including steps comprising generating for each of the parameter combinations a measure of the degree of confidence in the physical accuracy of the respective parameter combination.

5. The method of claim 1, wherein: the inverse of the scattering function comprises an Amplitude Versus Angle analysis.

6. The method of claim 1, wherein: the inverse operator is selected according to the source/receiver geometry used during acquisition of the seismic data samples.

7. The method of claim 6, in which the inverse operator is a combination of elements selected from a set of predetermined operators according to the source/receiver geometry.

* * * * *